United States Patent [19]
Wolfe

[11] Patent Number: 5,772,968
[45] Date of Patent: Jun. 30, 1998

[54] APPARATUS AND METHOD FOR HYDROLYZING KERATINACEOUS MATERIAL

[75] Inventor: Marvin R. Wolfe, Walton, Ky.

[73] Assignee: Sunrise, Inc., Walton, Ky.

[21] Appl. No.: 674,814

[22] Filed: Jul. 3, 1996

[51] Int. Cl.[6] .............................. A22C 21/00; A23J 1/10; A23K 1/10

[52] U.S. Cl. .............................. 422/189; 99/467; 99/471; 99/472; 99/483; 100/117; 100/145; 422/266; 422/269; 422/273; 530/357; 530/427; 530/827; 530/859

[58] Field of Search .............................. 99/360, 467–472, 99/483, 494, 516, 348, 443 C, 443 R, 477–479; 422/266, 309, 269, 273, 189; 241/74, 86, 88, 24.16, 117, 145, 147, 127, 82.7; 127/7, 45; 210/770, 393, 209, 414, 415; 452/138; 530/357, 427, 827, 859, 842; 426/657, 506, 807, 656, 455, 438, 425, 456

[56] References Cited

U.S. PATENT DOCUMENTS

| | | |
|---|---|---|
| 1,096,199 | 5/1914 | Schuyler . |
| 1,307,508 | 6/1919 | Meakin et al. . |
| 2,637,666 | 5/1953 | Langen . |
| 2,701,518 | 2/1955 | McDonald . |
| 2,702,245 | 2/1955 | Mayer . |
| 3,256,808 | 6/1966 | Hunt . |
| 3,272,632 | 9/1966 | Speer . |
| 3,464,342 | 9/1969 | Kleinkauf . |
| 3,555,998 | 1/1971 | Meakin . |
| 3,617,313 | 11/1971 | Harrington, Jr. . |
| 3,830,150 | 8/1974 | Retrum . |
| 3,922,147 | 11/1975 | Sze et al. .............................. 422/193 |
| 4,025,001 | 5/1977 | Yarem et al. . |
| 4,069,980 | 1/1978 | Yarem et al. . |
| 4,108,052 | 8/1978 | Cunningham .............................. 99/358 |
| 4,151,306 | 4/1979 | Williams et al. . |
| 4,172,073 | 10/1979 | Kadri et al. .............................. 426/657 |
| 4,231,926 | 11/1980 | Retrum . |
| 4,250,802 | 2/1981 | Rubio .............................. 99/348 |
| 4,266,473 | 5/1981 | Hunt et al. . |
| 4,269,865 | 5/1981 | Retrum . |
| 4,286,884 | 9/1981 | Retrum .............................. 426/456 |
| 4,287,157 | 9/1981 | Koch . |
| 4,289,067 | 9/1981 | Hanak . |
| 4,357,865 | 11/1982 | Knuth et al. . |
| 4,378,311 | 3/1983 | Retrum . |

(List continued on next page.)

FOREIGN PATENT DOCUMENTS 2335385  2/1973  Germany .

*Primary Examiner*—Timothy F. Simone
*Attorney, Agent, or Firm*—Middleton & Reutlinger; David W. Carrithers

[57] ABSTRACT

A hydrolyzer system, apparatus, and method for effecting the continuous conversion of offal, feathers, hair, and other keratinaceous material into usable protein products for further commercial usage. The hydrolyzer system includes a feed screw conveyor, transfer conduit, feed substrate expansion chamber, hydrolyzer, product expansion means, and dryer. The hydrolyzer utilizes direct steam injection heat transfer in combination with a feed expansion chamber means and means for agitation and mixing within the hydrolyzer to fluidize a plug of feather feed substrate formed in the transfer conduit by the feed screw conveyor. The apparatus provides a means for heating and fluidizing the feather feed substrate at elevated temperatures while mixing same to effect its hydrolyzation while preventing the escape of back pressure therefrom via a feed substrate plug formed by the feed screw conveyor. The hydrolyzer utilizes a feed side expansion chamber connected to the feed inlet of the hydrolyzer vessel to break apart the feed substrate plug at the inlet of the hydrolyzer and to increase the surface area of the feed substrate subjected to direct steam injection. Utilization of the expansion chamber and direct heat injection results in a decrease in the energy necessary to pull apart the feather plug by the screw conveyor/agitator in the hydrolyzation process.

24 Claims, 2 Drawing Sheets

U.S. PATENT DOCUMENTS

| | | |
|---|---|---|
| 4,397,230 | 8/1983 | Hunt et al. . |
| 4,401,019 | 8/1983 | Leonov et al. ............................ 99/471 |
| 4,497,733 | 2/1985 | Retrum . |
| 4,581,992 | 4/1986 | Koch . |
| 4,829,891 | 5/1989 | Satake ...................................... 99/471 |
| 4,915,830 | 4/1990 | Mackay et al. . |
| 4,997,578 | 3/1991 | Berggren . |
| 5,008,375 | 4/1991 | Fosbol et al. ............................ 422/189 |
| 5,033,370 | 7/1991 | Fosbol et al. ............................ 99/471 |
| 5,096,599 | 3/1992 | Granelli .................................. 422/228 |
| 5,106,583 | 4/1992 | Raysberg et al. .................. 422/102 X |
| 5,348,871 | 9/1994 | Scott et al. ......................... 422/234 X |
| 5,508,183 | 4/1996 | Scott et al. ......................... 422/234 X |

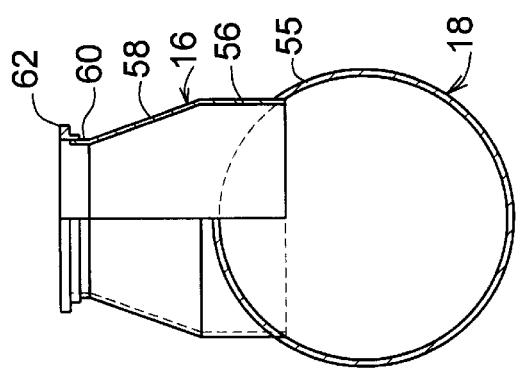
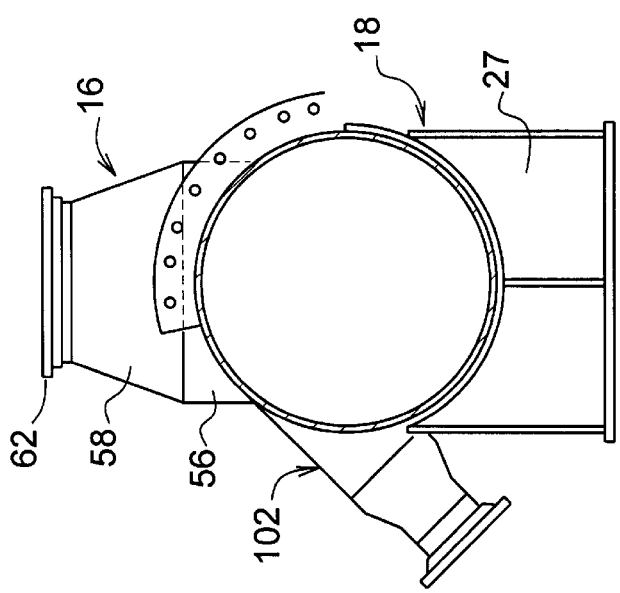
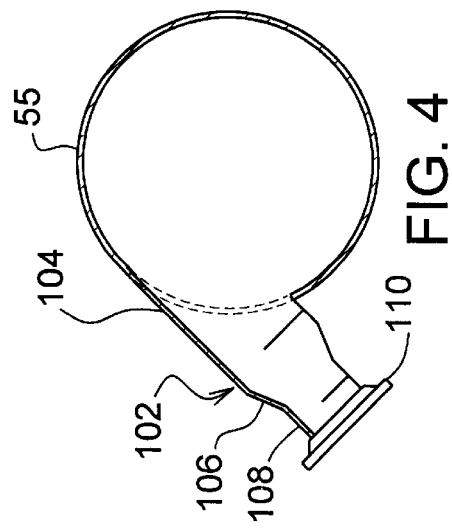
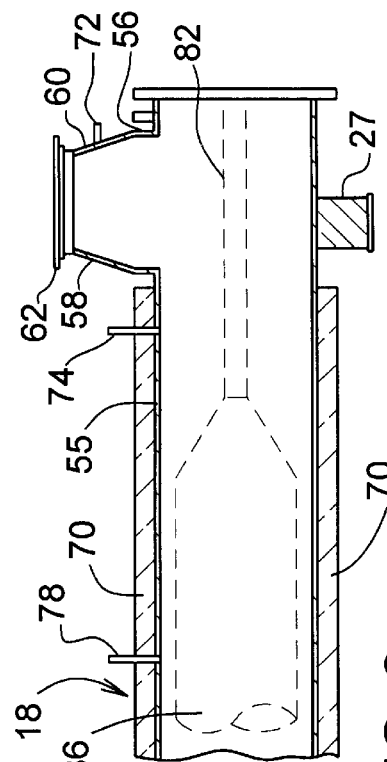
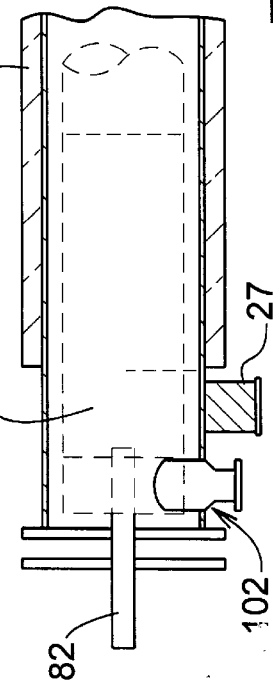

APPARATUS AND METHOD FOR HYDROLYZING KERATINACEOUS MATERIAL

BACKGROUND OF THE INVENTION

This invention relates generally to the hydrolysis of keratinaceous material, but more specifically pertains to the continuous processing of keratinaceous material for effecting its sustained hydrolyzation.

The keratins and the hydrolyzation process described using feathers as the selected feed substrate because most investigative work in this field has been done principally upon feathers.

As set forth in U.S. Pat. No. 4,378,311, incorporated herein by reference, feather keratins are comprised of protein consisting of eighteen different known amino acids.

In their natural condition, the keratins, such as is in feathers, are nearly indigestible to the animal stomach, 90% more or less of the product being indigestible in their natural state. Essentially keratins of this nature will pass directly through the digestive tract of the animal unused, mainly because of their great resistance to attack by the digestive juices and enzymes in the animal.

The process that is most universally used for treating keratinaceous feathers to improve their digestibility is the method of exposing them to water or steam at elevated temperatures, a process that may be generally identified as the steam hydrolysis method. Other processes that have been developed in attempting to improve upon the steam hydrolysis include the enzymatic, acids, or alkali hydrolysis, but such processes are overly expensive, or they may be destructive to the essential amino acids.

Feathers are softened by water at elevated temperatures. A temperature of 212° F. can be obtained at atmospheric pressure; while the rate of hydrolysis at that temperature is relatively negligible, the hot water does have an effect on the physical character of the feathers. The hot water has a tendency to remove the waxy coating upon the feathers and make them rather soggy, limp, and frangible, so that they may be susceptible to break up into pieces if agitated mechanically.

The peptide cross-links between the amino acids, can be broken by steam, enzymatic action, or by chemical hydrolysis. This frees the chains to unfold or unwind in a random manner. When this occurs, the protein loses its original native property and is said to be generally disorganized or denatured, even though there is no manifested change in its composition. In this condition its susceptibility to attack by digestive juices and enzymes is significantly increased.

Unfortunately, an adverse effect that can be detected only by actual feeding tests, results in decrease of nutritional availability beyond a certain point in the processing. This occurs in typical steam hydrolysis when the pepsin digestibility of the dried feather meal has reached approximately seventy-five percent. Above and below this point, the actual nutritional value drops off markedly. The time for pepsin digestibility decreases as the temperature and time increases in feather hydrolyzation.

The effects of agitation on the hydrolyzing reaction at any given temperature, such as by means of violent agitation, greatly increases the speed of the hydrolyzation process. A given pepsin digestibility can be developed at a given temperature in much less time, or at a lower temperature in the same amount of time, with the additional ingredient of agitation. This is no doubt due to the effect of the agitation in improving heat transfer, breaking up the feathers, and increasing their exposure to the water ingredient. Exposing the feathery mass to agitation, within the hydrolyzing vessel breaks up the feathery mass into much smaller pieces which increases product surface exposure to the hydrolyzing process and thereby greatly increase the speed of the chemical reaction.

Prior art apparatus and processes for effecting hydrolyzation of materials, including feathers, offal, hair, and blood substrate materials, generally incorporate structures that provide for the batch handling of such material to accomplish this desired result. The problem with the batch type of operation is that a substantial amount of time is required to load the standard vessel in which the feathers or other material are treated, and wherein the material may then be subjected to some agitation, before the feathers are either transferred to another vessel, or subjected to build up of heat and consequent pressure within that same vessel to effect their desired hydrolysis. Thus, and as can be readily understood, the necessary time for effecting the entire batch process in achieving the necessary temperature and pressure elevation, and chemical reaction, is substantial. Typically it may take several hours to load the standard vessel employed in this type of an operation, to build up the desired temperature and pressure through the indirect application of heat, and the desired temperature and pressure within the vessel to effect the hydrolyzation process. Moreover, a pressure and temperature reduction period is required before the batch of hydrolyzed feathers can be discharged or otherwise removed. The hydrolyzed material is then dried by the further application of heat. Thus, the batch process is an inefficient and may produce a variation in the degree of hydrolyzation of the end product obtained because of the variableness of the heat treatment that occurs during the extended exposure time.

Conventional continuous processes known in the art utilize indirect steam heating of the feed substrates at high pressures and a high rate of agitation, (high rotor rpm), which is energy inefficient typically utilizing approximately ¾ pounds of steam per pound of feathers and produces a high percentage on nondigestable proteins.

SUMMARY OF THE INVENTION

The subject of this invention provides a fully continuous process for the conversion of feathers, hair, or other keratinaceous materials, alone or in conjunction with additional poultry or animal by-products, and at a relatively high degree of efficiency and controllability into food products of improved nutritional value utilizing an apparatus having a specially designed conveying means and a process utilizing direct steam injection.

As shown in the drawings, chicken feathers, offal, hair, or other animal by-products providing a feed substrate are processed at a rate of about 20,000 to about 30,000 pounds per hour by feeding the substrate into a feed hopper of a screw conveyor for forming a plug flow of substrate therein. A screw conveyor de-waters and compresses the feathers and forms a continuous flow plug mass in a transfer conduit thereby sealing in the feed substrate to the hydrolyzing pressure vessel so as to prevent the escape of pressure, and therein effecting hydrolyzation in a form of continuous flow. The feathers substrate are continuously conveyed through the screw conveyor by a feed screw having several flights to remove excess water from the material and compress the feed substrate forming a plug in order to maintain the desired back-pressure in the hydrolyzer.

The feed screw of the screw conveyor compresses and conveys the substrate into a transfer conduit in fluid connection with the feed expansion chamber connected to the feed inlet section of a hydrolyzer. The screw conveyor squeezes the feathers or other fibrous material together so tightly that a seal is formed against the walls of screw conveyor housing so that steam is not allowed to escape from the hydrolzyer. Thus, the fibrous matting properties of the feed substrate under pressure creates its own pressure seal. The feed expansion chamber is a novel feature of the invention, in that the plug formed in the screw conveyor to create the back pressure needed to keep the pressurized steam within the hydrolyzer body, is rapidly expanded breaking the feed substrate plug into particles maximizing the surface area of the substrate subjected to live steam. The utilization of a feed expansion chamber provides a means to disperse the feathers of the plug flow and increase the amount of surface area of the feather substrate susceptible to direct steam. Moreover, the rapid expansion of the feed substrate in the expansion chamber reduces the necessity of using a high energy consuming motor to utilize agitator blades or rotors to shred the feed substrate plug fed into the hydrolyzer from the transfer conduit of the feed screw conveyor. It should be noted that the hydrolyzer of the present invention is operable by utilizing direct steam injection in the feed expansion chamber section and/or other feed inlet section; however, additional direct steam injection ports may be used to inject steam directly into the hydrolyzer body depending upon the type of substrate, residence time, and throughput desired through the hydrolyzer system. It should be noted that the use of the feed expansion chamber increases the efficiency and throughput rate of the hydrolyzation process as compared with conventional hydrolyzers known in the industry.

It is possible to convey and process the feed substrate through the hydrolyzer by utilizing the pressure gradient developed by the hydrolysis process, such as is described in U.S. Pat. No. 5,008,375, hereby incorporated by reference, preferably utilizing a means of mechanically mixing the substrate to improve the heat transfer within the feed substrate; however, utilization of the pressure gradient is assisted by inversion of the unit to utilize gravity flow or perhaps by maintaining the feed plug directly into the hydrolyzer body. Numerous types of screw configurations and mixing apparatus are known in the art for mixing and conveying the feed substrate through a hydrolyzer. Means for mixing may utilize flights or mixing paddles extending from a shaft or the hydrolyzer casing to aid in conveyance and shredding of the material such as taught in U.S. Pat. No. 3,464,342, U.S. Pat. No. 4,231,926, U.S. Pat. No. 4,231,926, U.S. Pat. No. 4,269,865, hereby incorporated by reference or by a screw apparatus such as taught by U.S. Pat. No. 3,617,313. The transition section from the shaft diameter to the increased diameter of the barrel main body may be accomplished utilizing a series of conical sections of increased diameter, a single conical section, or other means known in the art such as taught by the following patents, hereby incorporated by reference. Other shaft designs which are applicable to the present invention are taught in U.S. Pat. No. 4,069,980, U.S. Pat. No. 4,069,980, U.S. Pat. No. 4,025,001, U.S. Pat. No. 1,307,508, utilize a plurality of conveying shafts and flights; U.S. Pat. No. 1.096,199 U.S. Pat. No. 4,266,473, U.S. Pat. No. 4,55,998, U.S. Pat. No. 4,397,230, U.S. Pat. No. 2,637,666, U.S. Pat. No. 2,701,518, U.S. Pat. No. 4,289,067, U.S. Pat. No. 4,915,830, U.S. Pat. No. 4,997,578, U.S. Pat. No. 4,581,992, U.S. Pat. No. 4,581,992, U.S. Pat. No. 4,581,992, U.S. Pat. No. 4,357,865, German Patent 23 35 385, German Patent 23 34 385, and U.S. Pat. No. 1,344,790 utilize a tapered screw and/or casing means to convey material. All of the above-identified patents are incorporated by reference with respect to the screw, conveyor, and/or mixing apparatus which could be utilized in the present invention.

The preferred embodiment of the hydrolyzer of the present invention comprises a generally cylindrical outer shell or housing containing a cylindrical barrel or casing rotatably supported by a central shaft. The preferred embodiment includes a rotatable shaft extending through the hydrolzyer having a feed section of a reduced diameter, a uniform diameter as shown in the drawings, provided with a plurality of shredding or mixing flights and/or pegs to mix the material and assist in conveyance of the partially hydrolyzed feed substrate which enters the hydrolyzer through from the feed expansion chamber connected to the transfer conduit of the feed screw conveyor. The feed section of the hydrolyzer may utilize different types of shredding flights and/or paddles. The feed section of the hydrolyzer utilizes a shaft with mixing apparatus thereon to assist in the conveyance and mixing of the steam subjected feed substrate from the feed expansion chamber. The feed section moves the feed substrate forward through the main body of the hydrolyzer. At least one transition section connects the feed section to the casing of the main body forming a mixing section having a greater external diameter than the feed section or shaft. The mixing section casing and is spaced apart a selected narrow distance from the interior surface of the housing to compress the partially hydrolyzed material and increase heat transfer thereof. A flanges, studs, rods, or short mixing paddles are spaced apart from one another and extend outwardly and normal to the outer surface of the mixing section in the region where the casing is closely spaced apart from the interior surface of the wall of the housing of the hydrolyzer. As shown in the preferred embodiment and several of the referenced patents cited, the transition section may be formed by the use of one or more conical sections to connect the smaller diameter feed section to the larger diameter casing section.

The feathers form a plug between the flights and the wall of the feed screw conveyor to remove excess moisture within the feathers. The plug is broken apart in the feed expansion chamber connecting the hydrolyzer to the transfer conduit and subjected to live steam injected directly into the substrate hydrolyzing the material at an efficient rate utilizing approximately ¼ pound of steam per pound of feathers.

Conventional hydrolyzers often use indirect heat transfer by heating the housing or heating the shaft such as utilized in cookers; however, rotary steam fittings are expensive and require higher maintenance than utilization of direct injection steam in the feed expansion chamber of the present invention. A novel point in the present invention involves injecting steam directly into the feathers as the feathers are being moved through the hydrolyzer at a rate of ¼ pound of steam for every one pound of feathers. In the preferred embodiment, the steam is utilized most efficiently by injection into the expansion chamber where the plug from the screw conveyor is broken apart so as to heat a larger surface area of the feed substrate. However, it is contemplated that live steam may be injected directly before or after the feed expansion chamber at alternate points. Additional live steam injection ports may be utilized along the length of the hydrolzyer.

In order to make it possible to start and stop the process once in operation under pressure, a guillotine type of knife blade cut-off valve is positioned between the feed expansion chamber and the transfer conduit. The cut-off valve may be closed so that the blocking plate portion of the slide gate is slid across the matted fibers cutting them off and placing a barrier across the opening of the transfer conduit to maintain back pressure in the hydrolyzer in case the feed substrate becomes too soft resulting in a loss of the plug and pressure. An interlocking safety lock system turns off the screw conveyor motor or disengages the screw of the feed screw conveyor to prevent damage to the gate valve in the down position. The gate valve may be positioned anywhere between the hydrolyzer feed inlet and the exit of the feed screw conveyor.

A finished product having a whey like consistency at about 40% moisture which exists through a small hole of a selected size of less than two inches and preferably about $15/16$ of an inch in order to control the back-pressure. The product is then pushed into a series of expansion conduits which may be connected to a barometric condenser which instantaneously cool the product. The product is then fed to a rotary dryer to dry the product to about 14% moisture to be used as protein in animal feed.

More particularly, the process of this invention comprises the following steps. The wet raw material, such as feathers, hair, or other keratinaceous materials, which may even include ground up hooves and toenails, and with water added, if necessary, to provide a certain degree of wetness, is subjected while under continuous flow, without pressurization, and while being agitated, to the screw conveyor. The screw conveyor provides a softening of the feather or keratinaceous mass and is highly effective in breaking the feathers down into smaller or minuscule pieces. The screw augur conveying means within the screw conveyor agitates the feathers reducing the particle size and compressing the material removing excess water and other liquids to a desired moisture content for hydrolyzation. Excess water and other fluids are drained through a screen assembly disposed in the bottom of the screw conveyor. In this condition, the feathery substrate material is of a sufficiently flowable condition as to be conveyed in a continuous stream into a pressurized hydrolyzer vessel for hydrolyzation of the mass into the digestible product to improve its nutritional value.

In the hydrolyzation vessel the time required for a given degree of hydrolyzation at a given pressure is dependent upon the residence time of the agitation and heating of the substrate. Preferably this degree of agitation is established through rotation of its conveyor/mixing means at rotating speeds of less than 20 rpm. Conventional hydrolyzers generally employ agitation speeds at a much higher rpm; however, this requires larger motors and is inefficient compared to the present invention which conserves energy due to the lower rate of agitation. Direct steam injection of about 60 to about 120 pounds of steam, and more preferably about 80 to 90 pounds of steam into the expansion chamber feed section of the hydrolyzer. The feed substrate plug formed in the transfer conduit connecting the hydrolyzer to the screw conveyor is expanded and broken apart within the feed expansion chamber and injection of the steam therein and subsequent processing of the substrate in the hydrolyzer completely breaks down the substrate. The utilization of the feed expansion chamber together with direct steam injection into the feed substrate reduces residence time, increases energy efficiency, and provides a high percentage of digestible protein.

It is, therefore, the principal object of this invention to provide a fully continuous process for the production of usable food products from feathers, hair, nails, horns, hooves, and any other related keratinaceous materials.

It is another object of this invention to provide a fully continuous process for the production of usable food products from feathers, and other related keratinaceous materials, all with improved energy efficiency, while yielding a product having substantially improved nutritional value.

It is further object of this invention to provide a fully continuous process wherein feathers, hair, and other keratinaceous materials can be converted, at high efficiency, and under very controllable conditions, in combination with other poultry and animal by-products such as blood, offal, and the like, into a combination of food products having high nourishing value.

Yet another object of this invention is to provide a continuous process for hydrolyzing keratinaceous products, such as feathers, through a screw conveyor forming a plug, feed expansion chamber, direct steam injection, a hydrolyzer, an expansion means for cooling the hydrolyzed product, and dryer for reducing the moisture content of the product to a desired level.

It is yet another object of this invention is to provide an improved method for hydrolyzing feathers, or other keratinaceous materials by utilizing direct steam injection into the feed substrate in close proximity to the feed expansion chamber of the hydrolyzing pressure vessel to optimize energy efficiency of the process.

It is another object of the present invention to provide complete hydrolyzation of the feed substrate at a reduced residence time providing an increased percentage of digestible proteins.

It is another object of the present invention to provide complete agitation of the feed substrate material at a slow agitation rate of less than about 20 rpm to optimize the energy efficiency of the process.

Finally, it is yet another object of the present invention to utilize small motors as compared to conventional hydrolyzing equipment to reduce energy consumption in view of the utilization of direct steam into the substrate and the use of a feed expansion chamber.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 2 shows a cutaway side view of the hydrolyzer on support members, wherein the casing is shown in phantom lines, and the feed expansion chamber is shown connected to the feed inlet opening and the product discharge is shown extending downwardly from the hydrolyzer body;

FIG. 3 is a sectional front end view showing the feed expansion chamber joining the feed inlet section of the hydrolyzer;

FIG. 4 is a sectional rear end view showing the discharge conduit of the hydrolyzer; and FIG. 5 is a partial cutaway front end view showing the feed expansion chamber and discharge conduit.

SPECIFICATION

Figure 1:
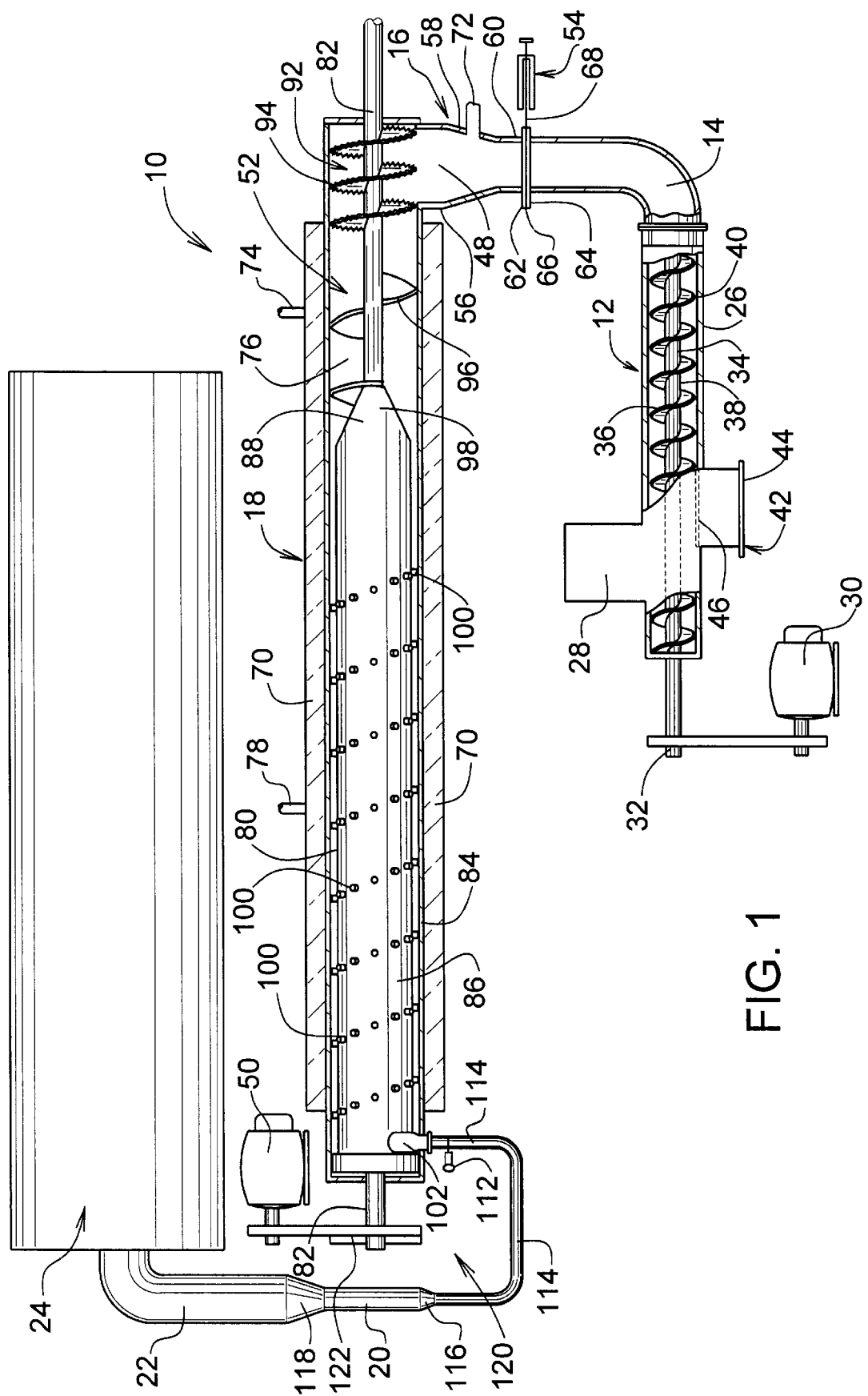
FIG. 1 shows a partial cutaway perspective side view of the feed screw conveyor and hydrolyzer, and barometric condenser and dryer assembly of the present invention.

The hydrolyzing system 10 of the present invention is comprised of a feed screw conveyor 12, a transfer conduit 14, a feed expansion chamber 16, a hydrolyzer unit 18, a first product expansion chamber 20, a second product expansion chamber 22, and a rotary dryer 24.

The equipment may be fabricated from steel, copper, aluminum, or other metals; however, stainless steel if utilized in the preferred embodiment to provide the strength and durability required for processing acidic feed substrate materials.

As best shown in FIG. 1, the feed screw conveyor 12 consists of a cylindrical housing or barrel 26 approximately 16 inches in diameter supported by a stand or support members 27. A feed substrate such as feathers having a moisture content of about 75% and a bulk density of about twenty-five and one-half (21.5) pounds per cubic foot are feed into the feed screw conveyor 12 at a rate of approximately 20,000 to 25,000 pounds per hour through a feed chute 28. A motor 30 engages a gear drive 32 to turn an auger type conveyor or feed screw 34 having a plurality of spiraling flights 36 extending from a central shaft 38 in close proximity to the inner wall 40 of the barrel 26 to shred, convey, and pack the feathers through the feed screw conveyor 12 forming a plug of densely packed feathers. The plug is formed in the end of the feed screw conveyor 12 by the pressure exerted by the feed screw 34 rotating at a low rpm and powered by a 25 Hp motor to maintain a constant feed rate of from about 18,000 to 20,000 pounds of feathers per hour. The pressure exerted by the feed screw 36 also compresses the feed substrate feather plug removing excess moisture to reduce the moisture in the plug to approximately 62% for feathers feed substrate. Conventional feed conveyors tend to trap moisture within the feathers to provide a means of heat transfer contrary to removal of the excess moisture as taught by the present invention. As illustrated in FIG. 1, the feed screw 12 includes a drain screen assembly section 42 consisting of a pan 44 and screen 46 for removal of the excess water created from compression of feed substrate by the feed screw 12 forming a high density solid mass feather plug having a bulk density of about seventeen (17) pounds per cubic foot. Removal of the water at the screw conveyor stage results in an decrease in the amount of heat energy required to hydrolyze and dry the protein product resulting therefrom in a significant energy savings for the overall process. It is contemplated that coagulated blood or other liquid fortifying agent may be pumped into the feed screw conveyor 12 at a point after the drain section 42 or directly into the hydrolyzer 18 for further processing.

The feather plug is pushed through a connecting straight section or as shown in the preferred embodiment, an elbow transfer conduit 14 which is approximately 16 inches in diameter. The feather plug is maintained in the transfer conduit 14 which is of a length sufficient to maintain a selected steam pressure in the hydrolyzer 18 in order to fluidize the feathers within the hydrolyzer 18. At about 95 psig., the steam flowing through the steam injector in the feed expansion chamber 16 connected to the hydrolyzer inlet 48 heats the feathers to approximately 140° to about 145° F. In conventional hydrolyzer systems, a conveyor mounted with the hydrolyzer 18 is required to pull the feather plug into the hydrolyzer 18 for shredding, agitating, mixing, the feed substrate thereby consuming a great amount of energy requiring a drive motor of great size and often high rpm. Contrary to the teachings of conventional methods, the hydrolyzer 18 of the present invention utilizes the feed expansion chamber 16 to initiate the breakup of the feather plug formed by the screw conveyor 12 and transferred to the feed expansion chamber 16 through the transfer conduit 14. The utilization of the feed expansion chamber 16 to break up the feed substrate feather plug provides a means to maintain control of the feather plug formed in the transfer conduit 14 by the feed screw conveyor 12, yet reduce the load on the conveyor/mixer screw of the hydrolyzer 18 which need not perform the task of pulling the plug into the hydrolyzer 18 and the initial work of breaking of the tightly packed plug. Thus, the instant invention is able to utilize a smaller hydrolyzer drive motor 50 to rotate an conveyor/mixer screw 52 at low rpm to increase efficiency as compared with conventional units. The feed expansion chamber 16 may be integrally formed as a portion of a transfer conduit 14 which includes a conical section on the discharge end.

As best shown in FIGS. 1–3 and 5, the feed expansion chamber 16 shown in the preferred embodiment includes a cylindrical base first section 56 having an internal diameter of about 80% as great as the internal diameter of the housing 55 hydrolyzer 18. Extending from the base 56 is a conical second section or cone 58 having a reduced internal diameter of about 55% as great as the diameter of the base 56. Extending from the top portion of the cone 58 is a third short straight section or collar 60 which is fitted with a flange 62 which cooperatively engages a flange 64 of the transfer conduit 14 having the cut-off valve 54 disposed thereinbetween. The exact dimensions of the feed expansion chamber 16 may vary and the first base section 56 and the collar 58 are not essential; however, the feed expansion chamber 16 requires a conical section 58 having an outlet of greater diameter than the inlet to provide for the feed expansion of the feather substrate and breaking up of the feather plug so that the hydrolyzer conveyor/mixer screw 52 is not burdened with pulling in and breaking up the dense plug being exiting the transfer conduit 14. As shown in the drawings, the feed expansion chamber 16 is vertically positioned on top of the hydrolzyer 18; however, the feed expansion chamber 16 may be on any side or angle with respect to the inlet 48 of the hydrolyzer 18.

In order to make it possible to start and stop the process once in operation under pressure, a guillotine type of knife blade cut-off valve 54 is positioned between the feed expansion chamber 16 and the transfer conduit 14. The cut-off valve 54 may be closed so that a blocking plate portion 66 of a slide gate 68 is slid across the matted fibers cutting them off and placing a barrier across the opening of the transfer conduit 14 to maintain back pressure in the hydrolyzer 18 in case the feed substrate becomes too soft resulting in a loss of the plug and pressure. An interlocking safety lock system turns off the feed screw conveyor motor 30 or disengages the screw 34 of the feed screw conveyor 12 to prevent damage to the gate valve 54 in the down position. The gate valve 54 may be positioned anywhere between the hydrolyzer feed inlet 48 and the exit of the feed screw conveyor 12.

The hydrolzyer unit 8 described in the preferred embodiment comprises a pressure vessel defining a housing "barrel" 55, approximately 32 feet long and about 38 inches in inside diameter. The hydrolyzer 18 in the preferred embodiment need not be heated by a steam jacket, nor insulated; however, it is contemplated that heat transfer efficiency may be increased by the use of insulating material 70 surrounding the hydrolyzer housing 55 such as is shown in FIGS. 1 and 2. The hydrolyzer 18 utilizes direct steam injection as a heat transfer medium in contrast to conventional units which utilize a less efficient heated steam jacket to effect heat transfer by conduction. Heat transfer by conventional steam jacket conduction methods require a much larger percentage of water in the feather feed substrate to effect heat transfer throughout the feed substrate for hydrolyzing the material than the steam injection method described herein which provides a substantial energy savings.

As shown in FIG. 1, at least one steam inlet, preferably sized to about 1 and ¼ inches in the preferred embodiment, is used to inject steam at about 80 to about 105 pounds per square inch, and preferably at about 95 pounds per square inch into the hydrolzyer 18 at one or more selected positions. The preferred embodiment utilizes a first steam injection inlet 72 at the feed expansion chamber 16; however, the first steam injection may be positioned immediately before or after the feed expansion chamber, so long as the steam is injected into the feather plug as the plug is breaking up and entering the inlet 48 of the hydrolyzer 18. A second injection steam inlet 74 may optionally be utilized in the conveying section 76 and/or a third steam injection inlet 78 in the mixing section 80 of the hydrolyzer 18. More or less steam may be used depending upon the composition of the feed substrate to be hydrolyzed. The steam is injected into the feather feed substrate at a point where compression of the feathers by the feed screw 12 has formed a plug in the transfer conduit 14 which prevents the steam from blowing back through the system to maintain a constant mixing and fluidization of the feed substrate throughout the fluidizing process. The present invention utilizing direct steam injection depends upon a novel feed expansion chamber 16 for providing a means for breaking up of the feed substrate to maximize the surface and heat transfer efficiency therefore and reducing the energy required to pull the feather plug into the hydrolyzer 18.

Supported within the hydrolyzer barrel 55 is a selected conveyor/mixer screw 52 supported by bearings at either end (not shown). The type or design of the conveyor/mixer screw 52 used is not critical and may be selected from any of the screw configurations referenced in the patents incorporated by reference herein or combinations thereof. As shown in FIGS. 1 and 2, the preferred embodiment uses an conveyor/mixer screw 52 having a central shaft 82 which is concentrically aligned with and extends through the entire length of the portion of the conveyor/mixer 52 supported within and spaced apart equal-distance from the inner wall 84 of the barrel 55. The shaft 82 is approximately 4½ inches in diameter. In the mixing section 80 of the hydrolyzer, the shaft 82 is surrounded by a cylindrical casing 86 which is approximately 30 inches in diameter. The casing 86 in the mixing section 80 is connected to the shaft 82 in the conveying section 76 by one or more short conical shaped transition sections 88.

The shaft 82 extends through the conveying section about ten to fifteen feet before the short conical transition section 88 which starts tapering from about six inches in diameter and increases to the join the outer diameter of the casing 86 having a diameter of about thirty inches. The length of the hydrolyzer 18 is designed to take into consideration the change in density from the time the raw feed substrate material enters the hydrolyzer through the inlet until it travels through the conveying section 76 and mixing section 80 of the hydrolyzer 18 to the discharge outlet 102 so that the finished fluidized product is not mixed with the incoming raw feather feed substrate. The key to a continuous system is to keep the material moving a continuous manner. In a pressurized vessel, it is difficult to keep the finish product from becoming mixed with the incoming raw product, therefore giving an inconsistent product wherein some of the material is under processed (undercooked) and some of the material is overprocessed (overcooked).

Extending radially from the distal end of the shaft 82 is a plurality of conveying flights 92 consisting of one or more spirals of solid blades 94 extending around the outer periphery of the central shaft 82 for providing primary shredding and conveyance of the material broken a part in the feed expansion chamber 16. One or more mixing paddles 96 or ribbons 98 may extend between the conveying flights 92. A plurality of mixing studs 100 protruding radially from the casing 86 to within a few inches of the inner wall 84 of the barrel 55 providing clearance for the processed material, and spaced apart from one another to further mix the partially fluidized feather feed substrate. The mixing studs 100 are positioned at selected points or randomly spaced therearound.

The discharge of the finished fluidized product is accomplished by aspiration. A small hole of $^{15}/_{16}$ inch in diameter forms a discharge outlet 102 at the discharge end of the hydrolyzer 18. As best shown in FIGS. 2 and 4–5, the discharge outlet 102 extends from the side of the of the barrel 55 and is positioned at an angle of about forty-five (45) degrees with respect to the horizontal axis so that the counterclockwise rotation of the casing 86 within the barrel 55 tends to force fluidized material out through the discharge outlet 102. As shown in the preferred embodiment, the discharge outlet 102 includes a cylindrical base section 104 having a diameter of approximately twelve inches. A conical transition section 106 joins the base section 104 with a short straight section or collar 108 which supports a flange 110 for connection to knife gate and discharge valve 112 in fluid connection with the discharge outlet 102 and is used to maintain a pressure of about 85 to about 90 pounds per square inch and allow a rate of about 20,000 pounds per hour discharge of the finished protein product having a whey type consistency and a bulk density of about sixty pounds per cubic foot. Moreover, the discharge valve 112 will open and close to maintain a constant temperature.

The discharge valve 112 is connected to a two inch transfer line 114 and then through a first expansion joint 116 into a six inch line forming a first product expansion chamber 22. The first product expansion chamber 22 is connected to a second expansion joint 118 which forms a second product expansion chamber 22. Often a barometric condenser is utilized to flash the vapor off of the hot product, because when the pressure is released from about 85 to about 90 psig, it expands in volume twenty-seven times in order to obtain atmospheric pressure. Expansion of the gases causes the product to flash giving off excess moisture, instantly cooling the product and reducing the moisture content of the material from about 65% to about 50% moisture. This reduces the cost of drying the material to about 12% to about 15% moisture by the use of steam heated rotary dryers 24 and also prevents surges in the air handling system. The material discharged from the dryer 24 yields a dry powder protein product of a desired particle size and moisture content.

The hydrolyzer 88 of the preferred embodiment utilizes a shaft drive end 120 which is driven by a gear box reduction mechanism 122 and 40 hp motor 50 to rotate the conveyor/mixer 52 at a very slow rate of about 13 to 18 rpm to conserve energy. The low rpm rate provides a retention time of about 10 to 12 minutes to effect a product discharge temperature of from about 290° to about 315° F. resulting in an increase in the percentage of digestible proteins of the fluidized product in the range of from about 82% to about 86%, and a reduction in degradation of the product through excess heat at long residence times such as is typical with conventional systems.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A hydrolyzer system, comprising:
   a feed screw conveyor having several flights for removing excess water from a keratineous feed substrate material, said feed screw compressing said feed substrate forming a plug;
   a hydrolyzer defining a cylindrical barrel having a central shaft rotatably supported therein, said central shaft including means for conveying and mixing said feed substrate, said hydrolyzer having an inlet and a discharge outlet;
   a transfer conduit in fluid communication with said feed screw conveyor;
   a feed expansion chamber in fluid communication with said transfer conduit and said hydrolyzer, said feed expansion chamber defining a cone having a larger diameter section in fluid communication with said inlet of said hydrolyzer;
   at least one product expansion chamber means for reducing the pressure in the hydrolyzer system and cooling the feed substrate product produced in said hydrolyzer; and
   a dryer for removing excess moisture from the hydrolyzed substrate.

2. The hydrolyzer system of claim 1, wherein said means for conveying and mixing said feed substrate of said central shaft comprises a reduced diameter conveying section, a casing defining an increased diameter mixing section, and at least one conical shaped transition section connecting said conveying section and said casing, said transition section having a length shorter than said conveying section or said casing.

3. The hydrolyzer system of claim 2, wherein said conveying section of said central shaft includes a plurality of flights and/or mixing paddles for shredding and conveying said feed substrate.

4. The hydrolyzer system of claim 2, wherein said transition section of said central shaft includes at least one flight, ribbon, stud, or paddle for conveying said feed substrate.

5. The hydrolyzer system of claim 2, wherein said casing includes at least one flight, ribbon, stud, or paddle spaced apart from said hydrolyzer barrel for mixing said feed substrate.

6. The hydrolyzer system of claim 1, including means for direct steam injection of steam into said feed substrate.

7. The hydrolyzer system of claim 6, wherein direct steam injection is injected into said feed substrate through said feed expansion chamber.

8. The hydrolyzer system of claim 6, wherein direct steam injection is injected into said feed substrate through said transfer conduit directly prior to said feed expansion chamber.

9. The hydrolyzer system of claim 6, wherein direct steam injection is injected into said feed substrate through said hydrolyzer inlet subsequent to said feed expansion chamber.

10. The hydrolyzer system of claim 6, wherein pressurized steam is injected into said feed substrate by direct steam injection into at least one of the group consisting of said feed expansion chamber, said transfer conduit, said hydrolyzer inlet, and said hydrolyzer barrel.

11. The hydrolyzer system of claim 1, including a cut-off valve positioned between said hydrolyzer inlet and said feed screw conveyor.

12. The hydrolyzer system of claim 1, including a discharge valve in fluid communication with said hydrolyzer discharge outlet.

13. A hydrolyzer system for fluidizing a keratineaous substrate, comprising:
    a feed screw conveyor having several flights for removing excess water from a keratineous feed substrate material, said feed screw compressing said feed substrate forming a plug;
    a hydrolyzer defining a cylindrical barrel having a central shaft rotatably supported therein, said central shaft including means for conveying and mixing said feed substrate, said hydrolyzer having an inlet and a discharge outlet; and
    a transfer conduit in fluid communication and positioned thereinbetween said feed screw conveyor and said hydrolzer, said transfer conduit including a conical section having an increased diameter portion for expanding said feed substrate plug in fluid connection with said inlet of said hydrolyzer.

14. The hydrolyzer system for fluidizing a keratineaous substrate of claim 13, wherein said means for conveying and mixing said feed substrate of said central shaft comprises a reduced diameter conveying section, a casing defining an increased diameter mixing section, and at least one conical shaped transition section connecting said conveying section and said casing, said transition section having a length shorter than said conveying section or said casing.

15. The hydrolyzer system for fluidizing a keratineaous substrate of claim 14, wherein said conveying section of said central shaft includes a plurality of flights and/or mixing paddles for shredding and conveying said feed substrate.

16. The hydrolyzer system for fluidizing a keratineaous substrate of claim 14, wherein said transition section of said central shaft includes at least one flight, ribbon, stud, or paddle for conveying said feed substrate.

17. The hydrolyzer system for fluidizing a keratineaous substrate of claim 14, wherein said casing includes at least one flight, ribbon, stud, or paddle spaced apart from said hydrolyzer barrel for mixing said feed substrate.

18. The hydrolyzer system for fluidizing a keratineaous of claim 13, including means for direct steam injection of steam into said feed substrate.

19. The hydrolyzer system for fluidizing a keratineaous of claim 18, wherein direct steam injection is injected into said feed substrate through said conical section of said transfer conduit.

20. The hydrolyzer system of claim 18, wherein direct steam injection is injected into said feed substrate through said transfer conduit directly prior to said conical section.

21. The hydrolyzer system of claim 18, wherein direct steam injection is injected into said feed substrate through said hydrolyzer inlet subsequent to said conical section chamber.

22. The hydrolyzer system of claim 18, wherein pressurized steam is injected into said feed substrate by direct steam injection into at least one of the group consisting of said transfer conduit conical section, said transfer conduit, said hydrolyzer inlet, and said hydrolyzer barrel.

23. The hydrolyzer system of claim 13, including a cut-off valve positioned between said hydrolyzer inlet and said feed screw conveyor.

24. The hydrolyzer system of claim 13, including a discharge valve in fluid communication with said hydrolyzer discharge outlet.

* * * * *